F. HAEHNEL.
Cigar Wrapper Cutter

No. 200,055.        Patented Feb. 5, 1878.

UNITED STATES PATENT OFFICE.

FREDERIC HAEHNEL, OF NEW ORLEANS, LOUISIANA, ASSIGNOR TO MAYER BROTHERS & HAEHNEL, OF SAME PLACE.

IMPROVEMENT IN CIGAR-WRAPPER CUTTERS.

Specification forming part of Letters Patent No. 200,055, dated February 5, 1878; application filed January 28, 1878.

*To all whom it may concern:*

Be it known that I, FREDERIC HAEHNEL, of New Orleans, in the parish of Orleans and State of Louisiana, have invented certain new and useful Improvements in Cigar-Wrapper Cutters; and I do hereby declare that the following is a full, clear, and exact description thereof, which will enable others skilled in the art to which it appertains to make and use the same, reference being had to the accompanying drawings, and to letters of reference marked thereon, which form a part of this specification.

My invention relates to cutters or knives for that class of cigar-making machines which are designed for the purpose of cutting out the cigar-wrappers by forming the base-plate upon which the cutter-knife acts of solid wood, rubber, or any other suitable material. By this means I am enabled to cut the wrappers more smoothly and uniformly than can otherwise be done.

My invention consists in forming the base-plate, made of wood, rubber, or other suitable material, of the form of the wrappers, merely a little wider than the wrapper itself, so as to allow the cutter or knife space enough to cut out the wrapper.

It also consists in a recessed knife or cutter holder into which the knife or cutter, of the form of the wrappers, is inserted, and firmly held in place by an inner detachable clamping-piece, all of which will be more fully described hereinafter, reference being had to the accompanying drawings, in which—

Figure 1:
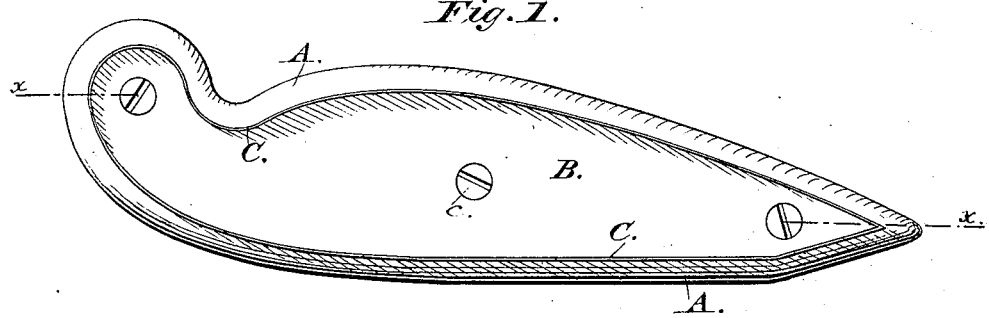
Figure 2:
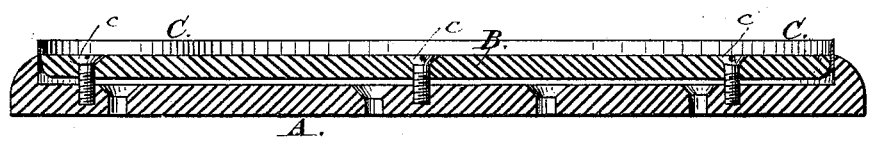
Figure 3:
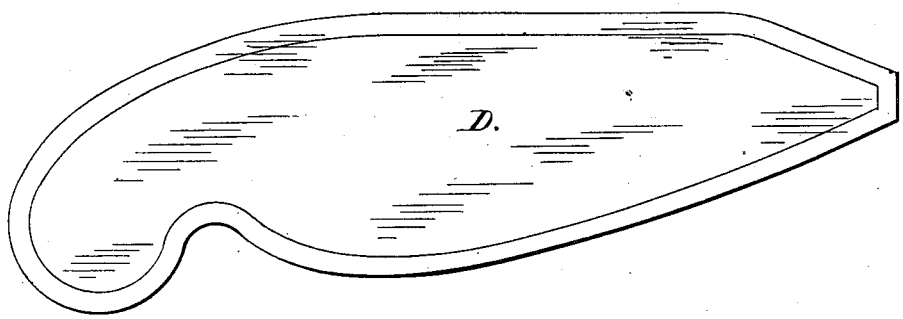
Figure 4:
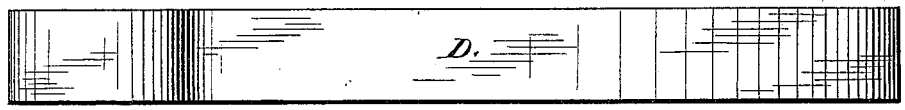

Figure 1 is a plan view of the cutter-holder, cutter, and clamping-piece. Fig. 2 is a vertical section on line $x\ x$ of Fig. 1. Fig. 3 is a plan view of the bed-plate. Fig. 4 is a side view of the same.

In the drawing, A is the cutter or knife holder, of the form of a wrapper, and is recessed, so as to receive the cutter or knife C. The cutter or knife C is clamped and held by a clamping-plate, B, and firmly secured in place by screws $c$ to the lower piece A, and this is attached to a lever-arm, or any other suitable device, so that it can be regularly operated up and down.

The bed-plate D, which is made of wood, rubber, or other equivalent material, is made to conform to the contour of the wrappers, merely being made a little larger on all sides, so that the cutter or knife shall have space enough to cut out the wrapper.

The object in giving the contour of the wrapper to the bed-plate is that the exact place from which the wrapper is to be cut from the wrapper-leaf can be readily seen and felt.

The object in making the knife or cutter detachable by the removal of the clamping-piece is that the cutter can be easily taken out for sharpening, repair, or replacing; and by making it to conform to the contour of the required wrapper, there is no waste of tobacco.

Having thus described my invention, what I claim, and desire to secure by Letters Patent, is—

1. In a cigar-machine, the bed-plate D, made of larger dimensions, but of a shape to conform to the contour of the wrapper to be cut by the reciprocating cutter, as shown, and for the purpose herein described.

2. In a cigar-machine, the cutter or knife holder A, recessed for the reception of the cutter C and clamping-piece B, arranged substantially as and for the purpose specified.

In testimony that I claim the foregoing as my own I hereby affix my signature in presence of two witnesses.

FREDERIC HAEHNEL.

Witnesses:
TH. D. MAYER,
SAML. C. MILLS.